Aug. 12, 1958     W. N. KESTNER ET AL     2,847,487
PREWASH FOR ACETYLENE REMOVAL FROM BUTADIENE STREAM
Filed Dec. 31, 1952
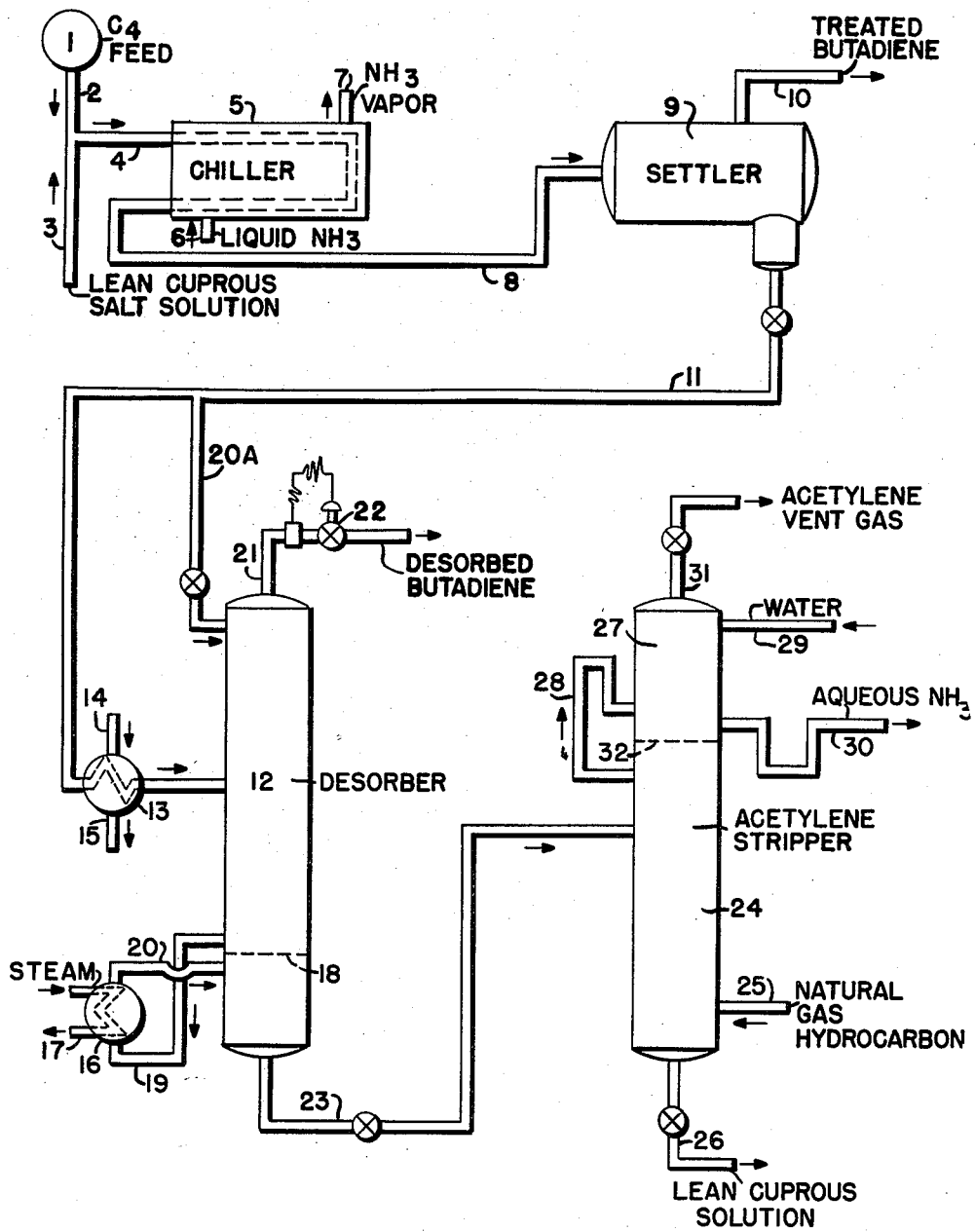
William N. Kestner
Walter C. Kohfeldt    Inventors
Samuel B. Eubank
By Henry Berk    Attorney

2,847,487
PREWASH FOR ACETYLENE REMOVAL FROM BUTADIENE STREAM

William N. Kestner, Walter C. Kohfeldt, and Samuel B. Eubank, Baton Rouge, La., assignors to Esso Research and Engineering Company, a corporation of Delaware Application December 31, 1952, Serial No. 329,064

2 Claims. (Cl. 260—681.5)

This invention relates to the use of a prewash system for removal of acetylenes from a butadiene-bearing stream prior to extraction of the butadiene in an extraction plant, particularly a plant which uses a cuprous ammonium acetate solution or similar kind of solvent.

The butadiene-bearing streams from some sources such as non-catalytic thermal cracking tend to contain substantial amounts of acetylenes like vinyl acetylene and ethyl acetylene that are known to cause difficulties in the extraction and purification of butadiene.

In the past, a number of methods were devised for removing polymers and other detrimental substances formed by the acetylenes during the extraction and butadiene recovery operations as shown in U. S. Patents 2,566,135; 2,566,136 and 2,566,137.

The above patents teach the kind of extraction with which the present invention is concerned and explain how the acetylenes form various polymerized substances in the extraction plant, but there are drawbacks in these processes which allow the acetylenes to be present during extraction of the butadiene.

The prewash system provided by the present invention is intended to eliminate the acetylenes from the butadiene feed prior to the extraction of the butadiene by a selective absorption of the acetylenes and rejection of the absorbed acetylenes with minimum polymerization of acetylenes and maximum recovery of butadiene.

A flow plan of means used in the prewash system is shown in the attached drawing.

The acetylene-contaminated butadiene-bearing stream from drum 1 is passed by line 2 to be mixed with a stream of lean cuprous ammonium acetate solution from line 3 and the resulting mixture is passed by line 4 through a chiller 5. A suitable refrigerant such as liquid ammonia is supplied by line 6 to the chiller. The refrigerant, e. g. ammonia vapor, following heat exchange is removed by line 7 from chiller 5.

The butadiene-bearing stream should be preferably mixed with a minor proportion of the lean solvent, e. g. preferably about six parts by weight of hydrocarbon to one of the solvent (cuprous ammonia acetate solution) or in the range of 3 to 8 parts hydrocarbon to 1 part solvent. This mixture is chilled in the chiller 5 preferably to about 40° F. or in the range of 20° to 50° F., and at such a temperature is transferred by line 8 to the settler drum 9, wherein the hydrocarbon phase is separated from the aqueous cuprous ammonium acetate solution containing absorbed acetylenes and a small amount of absorbed butadiene. Residence time for the chilling and settling of the mixture of the hydrocarbon stream and the aqueous cuprous ammonium acetate solution may be 5 to 15 minutes. The liquid hydrocarbon substantially free of acetylenes is decanted or drawn overhead from the settler 9 through line 10 for processing in a butadiene extraction plant.

The aqueous solution of cuprous ammonium acetate containing the absorbed acetylenes with a very small amount of absorbed butadiene is withdrawn from the bottom of the settler 9 through line 11 and is introduced into a packed desorber tower 12. This tower 12 is provided with a preheater 13 which receives steam from line 14 for heat exchange and is drained by line 15. A reboiler 16 is provided with a steam heating coil 17 for supplying heat to a bottoms fraction withdrawn from a plate 18 at the bottom portion of tower 12 through line 19 and the reheated bottoms portion is recycled by line 20. A controlled amount of cold reflux may be passed into the upper part of tower 12 by line 20a. The desorbed gaseous butadiene is withdrawn from the top of tower 12 through line 21 provided with a pressure control valve 22. By control of the variables of preheat, reflux, tower pressure and bottoms temperature a maximum desorption and recovery of the butadiene is accomplished with minimum acetylene rejection at this stage. The desirable butadiene taken overhead from tower 12 has sufficient purity to be blended with the product butadiene recovered in the butadiene extraction plant. The preheater, reboiler and tower are preferably designed for minimum holdup to lessen the opportunity for polymerization of acetylene. Acetylene polymerization increases the difficulty of subsequent removal of acetylene from the extraction solution. Low pressures in tower 12 of the order of about 15 p. s. i. g. (range: 0 to 30 p. s. i. g.) permits rejection of the butadiene at moderate temperatures. The feed and bottom temperatures of tower 12 may be of the order of 160° F. (range: 140° to 180° F.), and the overhead vapor temperature may be of the order of 70° F. (range: 50° to 90° F.).

The solution retaining the acetylenes withdrawn from the bottom of desorber tower 12 by line 23 is introduced into a packed acetylene stripper tower 24. Tower 24 may be operated at close to atmospheric pressure to cause the acetylenes to vaporize from the solution as it is passed into the intermediate part of tower 24. Stripping of the acetylenes from the solution in tower 24 is assisted by introduction of an inert gas, e. g., natural gas, or a gaseous $C_1$–$C_4$ paraffinic hydrocarbon at the bottom of the tower 24 by line 25. Accordingly, a substantially complete rejection of the acetylenes from the solution is accomplished in tower 24 without addition of heat. By thus stripping without addition of heat further acetylene polymerization is prevented. The acetylene free solution is withdrawn from the bottom of stripping column 24 by line 26 and may be recycled as lean solution in this part of the system or be used in the extraction plant as lean solution. If desired any small amount of polymers present in this lean solution may be removed by filtering through an absorbent such as char or clay type absorbents.

The acetylenes passed up through the tower 24 may be scrubbed in a scrubbing section 27 by being passed thereto by line 28. This scrubbing section is provided with an inlet 29 for water and a drain 30 for aqueous solution of ammonia which is scrubbed from the acetylene bearing gases. The residue of the acetylene bearing gases is vented through line 31 to be rejected from the system. Partition 32 separates the scrubbing section 27 from the stripping section below in column 24.

Typical absorption data obtained on the prewash system are set forth in the following table:

Table

| | |
|---|---|
| Acetylenes in untreated feed, p. p. m. | 950 |
| Acetylenes in treated feed, p. p. m. | Trace |
| Wt. ratio of hydrocarbon to solution | 6/1 |
| Treating temperature, ° F. | 40 |
| Contact time, minutes | 10 |

There are several distinctive features of the prewash system described, notably, (1) The selective separation of the acetylenes from the hydrocarbon feed treated with a relatively small proportion of extracting solvent in the chiller and settler combination prior to processing of the feed in a butadiene extraction plant.

(2) Controlled desorption of the small amount of butadiene which is absorbed with the acetylenes in order to obtain maximum butadiene recovery with minimum acetylene contamination and polymerization.

(3) Rejection of the acetylenes from the extracting solution in a manner which further prevents polymerization of the acetylenes or substantially suppresses polymerization.

By removal of acetylenes before the purposeful extraction of the butadiene, the quality of the butadiene product is improved with respect to acetylene content. By preventing the formation of acetylene polymers in the plant, the number of serious difficulties arising from such polymers are avoided, e. g., tower foaming, settler entrainment, and equipment plugging. A further advantage of the prewash system is the reduction in the overall equipment requirements for acetylene removal.

The prewash system described provides a highly desirable flexibility in selection of operating variables which govern the recovery of the butadiene which is absorbed with the acetylenes. This permits maximum butadiene recovery with minimum acetylene contamination. The prewash system is designed for minimum acetylene polymerization which permits efficient continuous desorption of acetylenes as a gas from the extracting solution.

The described prewash system is adapted for use with the various well-known cuprous salt solvents such as designated in the patents that have been referred to. In general, these solvents are made up of a cuprous salt, a fatty acid radical, and an alkaline radical such as ammonium or an organic nitrogen base.

Analysis of a typical such solvent:

| Component: | Range (as moles/liter) |
|---|---|
| Cupric copper | 0.2–0.3 |
| Cuprous copper | 2.8–3.5 |
| Ammonia | 8.0–12.0 |
| Acetate (as acetic acid) | 3.5–4.5 |
| Water (average) | 30.9 |

The composition of the cuprous salt solutions may be varied in many ways well known.

No difficulties were encountered with precipitation of copper acetylide during testing operations of streams containing about 950 p. p. m. acetylenes. Circulation of the cuprous salt solution may be increased to dissolve deposits, if necessary.

During desorption of butadiene from the solution containing extracted acetylenes or dissolved acetylides, as in desorber 12 and in the subsequent liberation of gaseous acetylene, the relatively low temperatures and short residence time minimized polymerization.

For example, suitable operating conditions in the stripping section of the acetylene stripper were as follows: 0 to 5 p. s. i. g. pressure, 140° to 180° F. and a residence period of generally less than one minute, preferably about 30 seconds or less. The injection of the inert hydrocarbon gas in the stripping is an important aid to the rapid removal of acetylenes under conditions of minimum polymerization.

The invention described is claimed as follows:

1. A prewashing operation for eliminating an acetylene from butadiene-bearing stream prior to extraction of the butadiene, which comprises admixing with said stream a cuprous salt solvent solution in an amount of from about 3 to 8 parts of said stream to one part solvent, chilling the mixture to a temperature of about 20 to 50°, to selectively absorb acetylene and a small amount of butadiene, separating the resulting extract solution of the absorbed acetylene with a small amount of absorbed butadiene dissolved in said salt solution from the remaining treated liquid butadiene, passing a portion of said extract solution separated from the treated liquid butadiene as a stream through a preheating zone into an intermediate part of a butadiene desorption zone wherein the butadiene is vaporized in said extract at temperatures in the range of 140° to 180° F., passing the butadiene vapors through an upper part of butadiene desorption zone, passing another portion of said extract solution separated from the liquid butadiene into an upper part of said butadiene desorption zone at temperatures in the range of 20° to 50° F. to impart a temperature of 50° to 90° F. to the butadiene vapors as they are taken overhead from said butadiene desorption zone to minimize acetylene desorption from said butadiene desorption zone, passing the residual extract solution of absorbed acetylenes free of butadiene from a bottom part of said butadiene desorption zone into an acetylene stripping zone, stripping the acetylene from the extract solution in said stripping zone by injection of natural gas containing $C_1$–$C_4$ gaseous paraffinic hydrocarbons without the addition of heat.

2. A prewashing operation for eliminating acetylene contaminants from a butadiene-bearing stream prior to extraction of the butadiene from said stream, which comprises mixing the liquid stream containing the butadiene and its contaminants with a liquid cuprous ammonium acetate solution in an amount of from about 3 to 8 parts of said stream to one part of the cuprous ammonium acetate solution chilling the resulting mixture to a temperature in the range of 20° to 50° F., passing the resulting mixture into a settling zone wherein liquid butadiene is separated from the aqueous cuprous ammonium acetate solution containing the absorbed acetylene contaminants with a small amount of absorbed butadiene, passing a portion of said solution containing the acetylene contaminants separated from the undissolved liquid butadiene as a stream through a preheating zone at 140° to 180° F. into an intermediate part of a butadiene desorption zone, passing the remaining portion of said aqueous solution at 20 to 50° F. separated from the undissolved liquid butadiene into an upper part of said desorption zone to control temperatures in the upper part of said zone and to minimize acetylene desorption from said butadiene desorption zone, withdrawing butadiene vapors at a temperature of 50° to 90° F. from the upper part of said desorption zone, passing residual solution of the acetylene contaminants freed of butadiene from a lower part of said desorption zone into an acetylene stripping zone and injecting a gaseous $C_1$ to $C_4$ paraffinic hydrocarbon into said stripping zone to aid in rapid removal of acetylenes from the solution.

References Cited in the file of this patent

UNITED STATES PATENTS

| | | |
|---|---|---|
| 2,185,989 | Roberts | Jan. 2, 1940 |
| 2,390,764 | Wolff | Dec. 11, 1945 |
| 2,453,853 | Morrell et al. | Nov. 16, 1948 |
| 2,467,845 | Morrell et al. | Apr. 19, 1949 |
| 2,670,810 | Dorsey | Mar. 2, 1954 |